US012638058B2

(12) United States Patent
Shahin

(10) Patent No.: US 12,638,058 B2
(45) Date of Patent: May 26, 2026

(54) BRAKE PISTON FOR VEHICLE BRAKE HAVING PLURALITY OF BRAKE FLUID RECEIVING PORTIONS

(71) Applicant: HL MANDO CORPORATION, Pyeongtaek-si (KR)

(72) Inventor: Hatem Shahin, Pfaffenhofen (DE)

(73) Assignee: HL MANDO CORPORATION, Pyeongtaeki si (KR)

(*) Notice: Subject to any disclaimer, the term of this patent is extended or adjusted under 35 U.S.C. 154(b) by 438 days.

(21) Appl. No.: 18/139,049

(22) Filed: Apr. 25, 2023

(65) Prior Publication Data

US 2023/0341019 A1 Oct. 26, 2023

(30) Foreign Application Priority Data

Apr. 26, 2022 (DE) .......................... 102022204043.0

(51) Int. Cl.
F16D 65/18 (2006.01)
*F16D 121/04* (2012.01)
*F16D 125/06* (2012.01)
*F16D 125/08* (2012.01)

(52) U.S. Cl.
CPC .......... F16D 65/18 (2013.01); *F16D 2121/04* (2013.01); *F16D 2125/06* (2013.01); *F16D 2125/08* (2013.01); *F16D 2250/0069* (2013.01); *F16D 2250/0076* (2013.01)

(58) Field of Classification Search
CPC .. F16D 65/18; F16D 2121/04; F16D 2125/06; F16D 2125/08; F16D 2250/0069; F16D 2250/0076
USPC .............................................. 188/73.1, 72.4
See application file for complete search history.

(56) References Cited

U.S. PATENT DOCUMENTS

| | | | |
|---|---|---|---|
| 4,605,104 A | 8/1986 | Thompson | |
| 5,052,277 A * | 10/1991 | Wirth | ...................... F16D 65/18 92/24 |
| 9,476,471 B2 * | 10/2016 | Bussiere | ................ B64C 25/44 |
| 10,591,008 B2 * | 3/2020 | Hashimoto | ......... F16D 65/0006 |
| 2018/0094681 A1 * | 4/2018 | Reuss | ...................... F16D 65/18 |
| 2020/0132147 A1 * | 4/2020 | Shahin | .................. F16D 65/567 |

FOREIGN PATENT DOCUMENTS

| | | |
|---|---|---|
| DE | 3923943 A1 | 1/1991 |
| DE | 4116502 A1 | 11/1992 |
| DE | 102015208152 A1 | 11/2016 |
| DE | 102018120764 B3 | 12/2019 |
| DE | 102018218195 A1 | 4/2020 |
| KR | 10-1998-0074843 A | 11/1998 |
| KR | 10-1285610 B1 | 7/2013 |

OTHER PUBLICATIONS

Office Action issued in corresponding German Patent Application No. 10 2022 204 043.0 dated Jan. 12, 2023.

* cited by examiner

*Primary Examiner* — Christopher P Schwartz
(74) *Attorney, Agent, or Firm* — LEE, HONG, DEGERMAN, KANG & WAIMEY

(57) ABSTRACT

The invention concerns a brake piston for a vehicle brake, the brake piston comprising:
a first member comprising a first piston end portion for resting against a brake pad of the vehicle brake;
a plurality of pipe-shaped second members that are each integrally formed with or connected to the first member and each comprise at least one brake fluid receiving portion that extends along a longitudinal axis of the brake piston.

14 Claims, 7 Drawing Sheets

BRAKE PISTON FOR VEHICLE BRAKE HAVING PLURALITY OF BRAKE FLUID RECEIVING PORTIONS

CROSS-REFERENCE TO RELATED APPLICATION

This application is based on and claims priority under 35 U.S.C. § 119 to German Patent Application No. 102022204043.0, filed on Apr. 26, 2022 in the German Patent and Trade Mark Office, the disclosures of which are incorporated herein by reference.

TECHNICAL FIELD

The invention relates to a brake piston and a brake piston arrangement for a vehicle brake. The vehicle may e.g. be a road vehicle, such as a car, a truck or a bus. The vehicle brake may in particular be a vehicle disc brake.

BACKGROUND

Brake pistons are typically received in cavities formed in brake calipers or in other housing components. Part of an outer surface of the brake piston and at least part of an inner surface of the cavity confine a hydraulic chamber. By varying a hydraulic pressure in said hydraulic chamber, the brake piston can be moved back and forth, thus acting on a brake pad. The brake pad can thus be pressed into contact with e.g. a brake disc to generate brake forces.

So far, brake pistons are typically configured as cylindrical members having a substantially constant diameter. An example can be found in U.S. Pat. No. 10,591,008 B2. To reduce a required brake fluid intake, DE 10 2018 218 195 B4 suggests a brake piston confining a brake fluid receiving cavity, the brake piston and thus the cavity having a diameter-reduced central portion.

While these existing solutions offer some advantages, there is still room for improvement. For example, known brake systems still suffer from large weight, height costs and might not be able reliably generate a uniform contact and and/pressure between a brake disc and a brake pad that is displaced by the brake piston. This may result in non-uniform brake pad wear, a generation of squeal noises and a non-uniform generation of frictional heat during braking.

SUMMARY

It is an object of the present invention to address at least some of these existing disadvantages.

This object is solved by the subject matter according to the attached independent claims. Further embodiments are defined in this description and in the dependent claims.

Accordingly, a brake piston for a vehicle brake is suggested, the brake piston comprising:

a first member comprising a first piston end portion for resting against (in particular contacting) a brake pad of the vehicle brake;

a plurality of pipe-shaped second members that are each integrally formed with or connected to the first member and each comprise at least one brake fluid receiving portion that extends along a longitudinal axis of the brake piston.

A radial dimension of the fluid receiving portion of each second member may be smaller than a radial dimension of the first member. For example, the radial dimension of each brake fluid receiving portion may not amount to more than one quarter or more than 10% of a radial dimension of the first member. In one example, a radial outer or inner dimension of each second member may be less than 50 mm or less than 20 mm, e.g. between 1 mm and 15 mm. The inner dimension may be equivalent to a radial dimension of the brake fluid receiving portion.

By providing a plurality of second members receiving brake fluid, the piston diameter can be reduced compared to known solutions having one central brake fluid receiving portion that is enclosed by the piston's outer surface. Accordingly, the size and weight of the brake piston can be reduced. As detailed below, this also means that size of a cavity receiving the brake piston can equally be reduced, thereby improving compactness.

The reduced diameter the piston and each of the second members also allows for a reduction in brake fluid volume received by and needed for displacing the piston.

Moreover the plurality of second members enables generating a locally varying brake pressure distribution which acts on the first member and thus the brake pad. For example, at least one second member may be connected off-center to the first member (i.e., off-center with respect to a geometric center of the first member), thereby generating a concentrated local pressure at said off-centre position. Further examples of pressure distributions that are defined by the plurality of second members are given below.

If not integrally formed, the first and the second member may be separately produced and/or separately provided, e.g. as separate pieces of separate parts. They may be connected to one another during an assembly process of the brake piston. An advantage of configuring the brake piston of respective separate members is that each of said members can be produced with an individually optimised production method and/or may comprise a material that is optimised with respect to the individual function of said member. This increases flexibility and may help to limit costs and weight. For example, the first member may be metallic. It may be produced e.g. by punching or cutting. The second members may be metallic or non-metallic (e.g. made of plastic). They may generally comprise a different material compared to the first member. The second members may e.g. be produced by any known pipe-production method.

The first member may extend at an angle and in particular orthogonally to the longitudinal axis. The second members may each extend at a smaller angle to the longitudinal axis than the first member, e.g. be only slightly tilted relative thereto (but still be oriented along said axis). Alternatively, the second members may extend in parallel to the longitudinal axis and/or their longitudinal axes may coincide with the piston's longitudinal axis.

Generally, the first member and/or at least one of the second members may be concentrically arranged with respect to the piston's longitudinal axis. The radial dimension of any of the first and second members may be a diameter. Any of the herein disclosed dimensions, arrangements and spatial relations may at least be present in a cross-sectional plane of the brake piston which comprises the longitudinal axis. Said cross-sectional plane may extend orthogonally to the brake pad and/or to a side face of a brake disc that is contacted by the brake pad.

The second members may be arranged in parallel to one another and/or may be radially spaced from one another. They may axially overlap one another and/or be arranged in one common axial section. For example, first ends of the second members may be located at a common axial position (e.g. at the first member) and second ends of the second members may be located at another common axial position (e.g. remote from the first member)

In one example, the first member is a plate-shaped member. It may have a constant thickness and/or dimension which simplifies its production.

The second members may each be a pipe. The second members may each have at least one opening for receiving the brake fluid, said opening facing away from the first member. The opening may be provided in one axial end portion of the second member and in particular in an end face thereof. An optional opening in another (opposite) axial end portion may be closed by the first member. Alternatively, the second members may each be e.g. integrally closed at said other axial end portion. For receiving the brake fluid, the second members may each comprise an elongated hollow portion or cavity forming the respective brake fluid receiving portion.

In one example, each second member has a substantially constant cross-sectional shape and/or substantially constant radial dimension, e.g. along all or substantially all of its length. This simplifies production and improves the uniformity of hydraulic flows. For example, there may only be local deviations from said shape and/or radial dimensions, e.g. by optional grooves. Accordingly, along at least 75% or at least 90% of the length of each second member, the cross-sectional shape and/or radial dimension may be constant, thus being substantially constant overall.

According to a further embodiment, the connection between the first member and each second member includes a mechanical connection or a materially bonded connection. In the latter case, the connection may e.g. be formed by welding, soldering and/or glueing. The mechanical connection may e.g. include providing a form fit and/or force fit between the first and second member. The mechanical connection may include at least one mechanical fixing element, such as a screw bolt.

Generally, the second member may not contact any structures surrounding the piston, such as surrounding inner walls of a cavity in which the piston is received and/or a brake fluid seal for providing a seal between said cavity and the piston. This limits the manufacturing tolerances required for the second member.

The brake piston may further comprise a second piston end portion. This portion may be located at an axially opposite end from the first piston end portion. A radial dimension of said second piston end portion may be larger than a radial dimension of each brake fluid receiving portion. It may also be larger than a radial dimension of a (virtual) circle enclosing the second members. Put differently, it's radially outermost position may exceed a radially outermost position of any of the second members.

The second piston end portion may contact the surrounding cavity and/or a seal provided at and in contact with said cavity. It may thus provide a dedicated portion of limited length for providing an optional sealing function and/or guiding function of the piston within the cavity.

The second piston end portion may be comprised by a third member that is connected to each of the second members. Generally, the first member and the second members may be arranged in an axial sequence, followed by the optional third member. An axial length of the second members and may exceed an axial length of any of the first member and the optional third member. By providing the separate third member, increased manufacturing accuracy e.g. needed for an optional sealing function or cavity contact can be limited to said part, thereby reducing overall costs.

A radial dimension of said second piston end portion may be smaller than the radial dimension of the first piston end portion. The enlarged radial dimension of the first piston end portion may ensure a sufficiently large contact area for resting against the brake pad. The smaller radial dimension of the second piston end portion may increase compactness of the brake piston and save weight.

The second piston end portion comprises at least one fluid channel that is in fluidic communication with at least one the fluid receiving portion. Said channel may e.g. be aligned with an above-discussed opening in a respective second member for receiving the brake fluid.

Each of said second members may be connected to an optional third member comprising the second end part. Also, each of the second members (and more precisely their fluid receiving portions) may be in fluidic communication with a fluid channel in the second piston end portion (and/or the third member), e.g. one fluid channel per second member.

According to one embodiment, the second members are circumferentially spaced about the longitudinal axis, e.g. a constant angular distances form one another. Additionally or alternatively, the radial dimensions of the second members and/or of their respective brake fluid receiving portions may differ from one another. This helps to define desired local pressure distributions across and acting on the first member and thus the brake pad.

In a second aspect, the invention also concerns a brake piston for a vehicle brake, the brake piston comprising:
  a first member comprising a first piston end portion for resting against a brake pad of the vehicle brake;
  a pipe-shaped second member integrally formed with or (when separately formed) connected to the first member and comprising at least one brake fluid receiving portion that extends along a longitudinal axis of the brake piston;
wherein a radial dimension of the brake fluid receiving portion is smaller than one quarter of a radial dimension of the first member and a radial dimension of the brake fluid receiving portion varies by substantially 0% or not more than 40% (or not more than 30%, 10% or 5%) along a length of the brake fluid receiving portion.

The radial dimension may thus be constant or only slightly vary along the length of the brake fluid receiving portion. In particular, it may continuously vary along said length, e.g. continuously decrease or increase.

The above brake piston provides further space and brake fluid reductions, e.g. compared to DE 10 2018 218 195 B4. In the latter case, reductions of the radial dimensions are limited by the need to internally receive components of a parking brake mechanism. Also, the radial dimensions of a comparable brake fluid receiving portion of this teaching are reduced in only one section. Following that section, the radial dimensions are again increased to provide a contact shoulder for contacting the parking brake mechanism. This limits the achievable reduction in brake fluid volume received by the brake fluid receiving portion.

According to any of the presently disclosed aspects, at least one elongated small-diameter pipe-shaped second member receives brake fluid, but preferably does not receive any further components, in particular not of a parking brake mechanism. This enables a respectively reduced and in particular constant inner diameter of said pipe-shaped second member.

In the second aspect, there may be exactly one second member and/or this second member may be the only member of the piston receiving brake fluid. Any of the options, embodiments and variations (especially of the second member) discussed with respect to the first aspect may equally apply to the second aspect's brake piston and in particular to its second member.

The invention also concerns a brake piston arrangement, comprising:

a housing having a cavity;

a brake piston according to any of the previous examples; wherein the brake piston is received in said cavity.

The housing may e.g. be formed by a brake caliper. The cavity may be cylindrical. The cavity may extend along the longitudinal axis of the brake piston and/or its longitudinal axis may coincide with that of the brake piston.

The cavity may have a constant cross-section and/or a constant radial dimension (in particular a constant diameter). Alternatively, its cross-section and/or radial dimension may vary. For example, it may have a first section for receiving the first member and a second section for receiving the second member or the plurality of second members, wherein a radial dimension of the second section is smaller than a radial dimension of the first section (e.g. at most two thirds or at most half of the radial dimension of said first section). This way, the cavity may be adjusted to the diameter variations of the brake piston, thereby increasing compactness of the cavity.

In case a second piston end portion and in particular a third member of the above kind is provided, the cavity's second section may be dimensioned to receive said second piston end portion or third member, respectively.

Note that any of the above-discussed receiving functions of the cavity may at least apply to a non-displaced (i.e., non-braking) state of the brake piston.

According to a further embodiment, the brake piston comprises a fluid seal contacting the brake piston and the housing and being arranged in the second section of the cavity. It may be the only seal contacting the brake piston and the housing (and thus sealing these members relative to one another) and/or there may be no respective seal in the cavity's first portion. This limits the size of the hydraulic chamber enclosed by the piston and cavity (and said seal), thereby reducing a required brake fluid volume.

BRIEF DESCRIPTION OF DRAWINGS

Embodiments of the invention are discussed below with respect to the attached schematic figures. Same or similar features may be marked with same reference signs throughout the figures.

DETAILED DESCRIPTION

Figure 1:
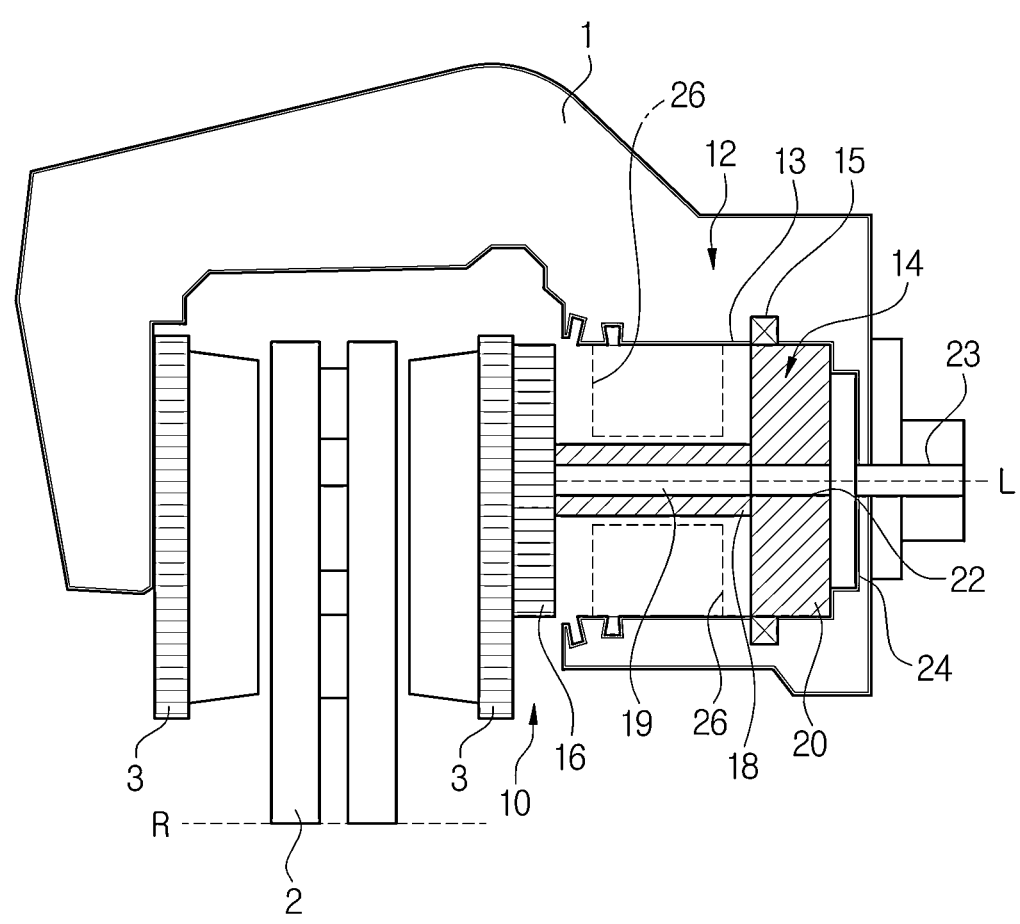
FIG. 1 is a sectional view of vehicle brake comprising a brake arrangement and brake piston according to a first embodiment of the invention.

FIG. 1 shows a vehicle disc brake comprising a brake arrangement 10 according to an embodiment of the invention. The vehicle disc brake comprises a caliper 1 which forms a housing 12 of the brake arrangement 10, said housing 12 having a cavity 13. The brake arrangement 10 also comprises a brake piston 14.

The vehicle disc brake further comprises a brake disc 2 and a pair of brake pads 3 that are arranged on opposite side faces of the brake disc 12. Only the upper half of the brake disc 2 is shown and the brake disc 2 is generally configured to rotate about a rotation axis R.

One of the brake pads 3 and in particular an end plate thereof is contacted by the brake piston 14. By the displacing the brake piston 14, the brake pad 3 can be pressed against the respectively opposite side face of the brake disc 2. According to known floating caliper principles, the other brake pad 3 is thus be forced into contact with the other side face of the brake disc 2, thereby clamping the brake disc 2 between the brake pads 3 and generating a braking effect.

The brake piston 14 comprises a first plate-shaped member 16 extending orthogonally to a longitudinal axis L of the brake piston 14. The brake piston 14 also comprises a second member 18 that is configured as a pipe with a constant inner and outer cross-section and a constant inner and outer diameter (i.e. radial dimension) along its length. The second member 18 extends along and concentrically with respect to the longitudinal axis L. An elongated hollow portion of the second member 18 forms a brake fluid receiving portion 19.

The brake piston 14 also comprises a third member 20 having a fluid channel 22 in fluidic communication with the brake fluid receiving portion 19 and with an external brake fluid supply line 23. The third member 20 is a plate- or block-shaped member. The first member 16 forms a first piston end portion (i.e. a left end portion FIG. 1), whereas the third member 20 forms an opposite second piston end portion (i.e. a right end portion in FIG. 1). The second member 18 is axially arranged between the first member 16 the third member 20. The first member 16 and the third member 20 are thus axially spaced apart by said third member 20.

In FIG. 1, the brake piston 14 and housing 12 are depicted in a sectional view with the sectional plane comprising the longitudinal axis L and the rotation axis R. The second member 18 and third member 20 both have a circular cross-section. A diameter of the second member 18 is smaller than that of the third member 20, but also as a radial dimension of the first member 16. This may concern the radial dimension in the depicted sectional plane, but may also apply with respect to any radial dimension of the first member 16. The diameter of the brake fluid receiving portion 19 of the second member 18 amounts to less than one quarter of the radial dimension of the first member 16 depicted in FIG. 1.

The second member 18 is radially spaced apart from the cavity 13 and does not contact the inner surface 26 of said cavity 13. The third member 20, on the other hand, is close to the inner surface 26 of said cavity 13 and contacts an optional brake fluid seal 15 arranged in a circumferential groove of the cavity 13.

The brake fluid receiving portion 19, the fluid channel 22 and an optional gap 24 between the third member 20 and cavity 13 delimit a hydraulic chamber. A brake fluid volume entering said hydraulic chamber via the brake fluid supply 23 increases the hydraulic pressure in the hydraulic chamber and pushes the brake piston 14 against the adjacent brake pad 13. This way, the brake pad 13 can be forced into contact with the brake disc 2 by the brake piston 14. When reducing the hydraulic pressure, an opposite movement of the brake piston 14 back into the position shown in FIG. 1 occurs. This can be supported by known resetting means, such as an optional resetting function of the seal 15 or at least one non-illustrated resetting spring.

In FIG. 1, dotted lines mark a possible alternative outline of the inner surface 26 of the cavity 13. More precisely, an inner diameter of said cavity 13 can be reduced in a portion axially overlapping with the second member 18. Thus, compactness of the cavity 13 and of the brake arrangement 10 can be increased.

Figure 2:
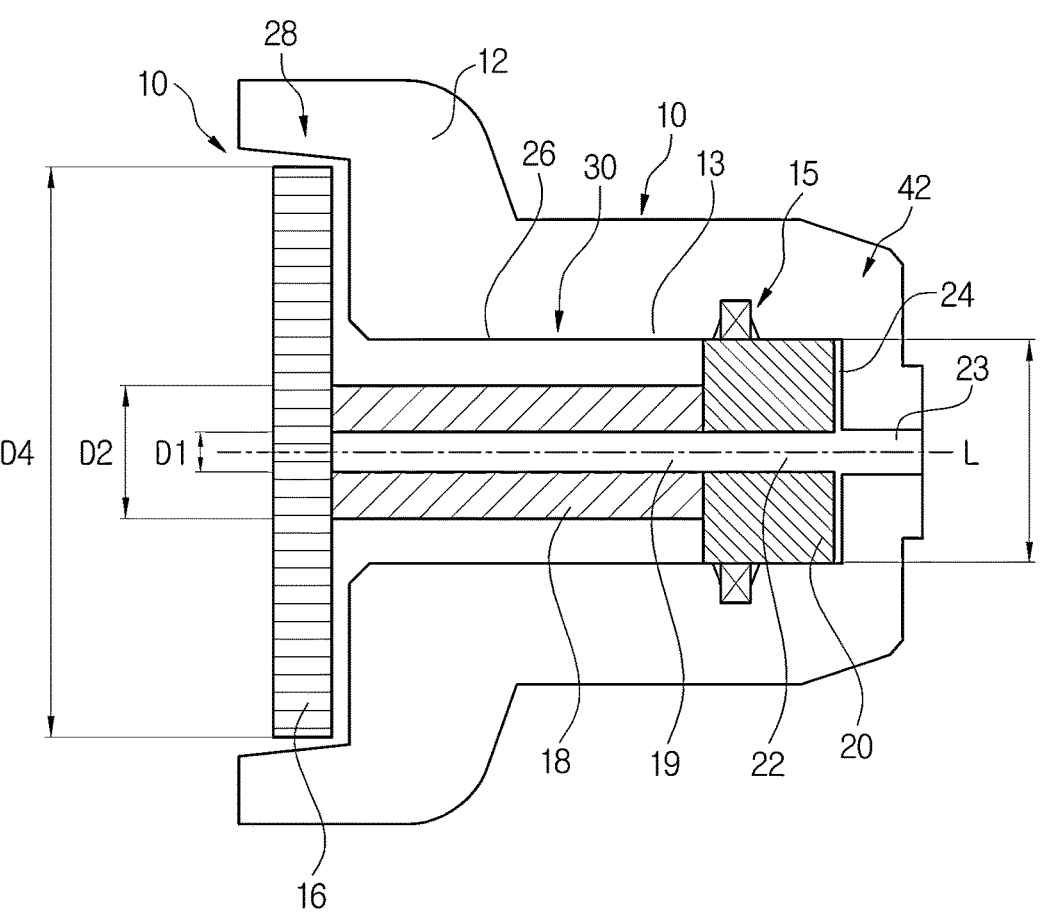
FIG. 2 is a sectional view of a brake arrangement according to a second embodiment of the invention.

FIG. 2 shows a brake arrangement 10 according to a second embodiment of the invention. The brake arrangement 10 again comprises a housing 12 that may e.g. be an integrated part of an otherwise non-illustrated caliper. The housing 12 again comprises a cavity 13 receiving a brake piston 14. The brake piston 14 is generally configured similar to the embodiment of FIG. 1, except for the radial dimensions of the third member 20.

More precisely, along the longitudinal axis L of the brake piston 14 an axial succession of a first plate shaped member 16, a second pipe-shaped member 18 comprising an elongated hollow cylindrical brake fluid receiving portion 19 and the third member 20 is defined. Accordingly, the first member 16 comprises a first piston end portion 40 and the third member 20 comprises a second piston end portion 42.

The diameter D2 of the second member 18 and in particular the diameter D1 of its brake fluid receiving portion 19 is again smaller than a radial dimension D4 of the first member 16. The diameter D3 of the third member 20 is larger than the diameter D2 of the second member 18 (but e.g. only slightly larger, such as not more than 30% larger). On the other hand, it is significantly smaller than the radial dimension D4 of the first member 16 (e.g. less than half of said radial dimension D4). The third member 20 rests against a brake fluid seal 15.

The shape of the cavity 13 and specifically the diameters of its inner surface 26 are adjusted to these differences in radial dimensions of the first to third members 16, 18, 20. When viewed from left to right in FIG. 1, a first portion 28 of the cavity 13 has a diameter larger than the radial dimension D4 of the first member 16, whereas an axially adjacent second portion 30 of the cavity 13 has a significantly reduced diameter (e.g. reduced by at least half). This stepped configuration of the cavity 13 again increases compactness.

Note that contrary to the illustration FIG. 2, the shape of the outer surface of the housing 12 does not have to resemble the stepped configuration of the inner surface 26 of cavity 13 but may deviate from.

In FIGS. 1 and 2, only one second member 18 is visible in only one such member 18 may be present. However, there may be more second members 18 that are e.g. arranged outside of and/or are not intersected by the sectional plane of FIGS. 1 and 2. For example, there may be another second member 18 in front of or behind the depicted second member 18 when viewed along an axis extending orthogonally to the image plane.

Figure 3:
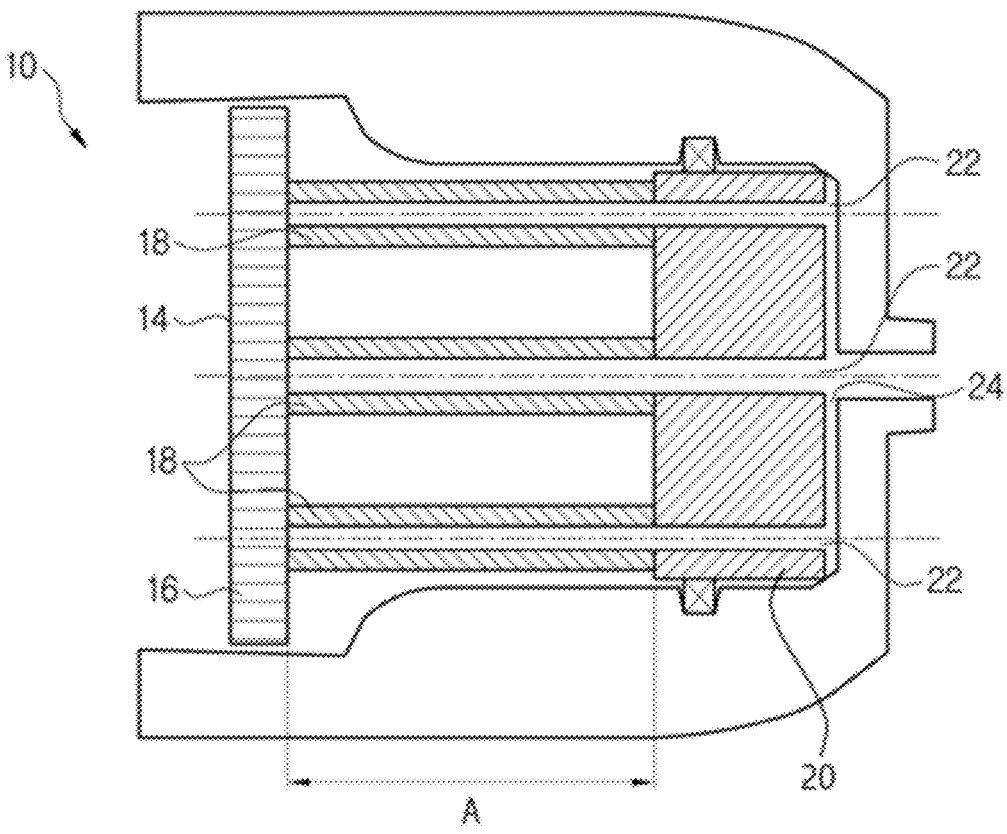
FIG. 3 is a sectional view of a brake arrangement according to a third embodiment of the invention.

FIG. 3 shows a brake arrangement 10 according to a third embodiment of the invention. In in this case, the brake piston 14 has an illustrated plurality of second members 18 that are radially spaced from one another. Only by way of example, the second members 18 extend in parallel and each have similar radial dimensions and axial dimensions. Also, they axially overlap one another and, more precisely, extent in one common axial section A. Again, they connect a first plate-shaped member 18 and third member 20.

The diameter relations between each of the second members 18 and the first member 16 and third member 20 are similar to those of FIG. 2. However, the diameter of the third member 20 is enlarged compared to FIG. 2 because it is connected to each of the radially spaced apart second members 18. Also, the third member 20 comprises fluid channels 22 in fluidic communication with each of the second members 18 (i.e. with each of their brake fluid receiving portions 19). The fluid channels 22 are connected to one another by a gap 24 similar to that of FIG. 1. Said gap 24 is formed at the latest when slightly moving the piston 14 to the left in FIG. 3 after an initial brake fluid pressure increase. The third member 20 again rests against an optional brake fluid seal 15.

Figure 4:
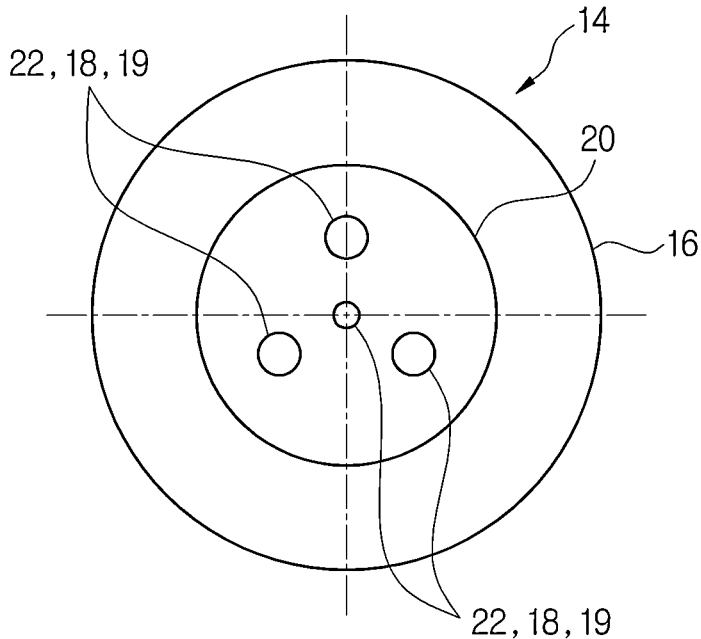
FIGS. 4-6 are rear views of brake pistons according to further embodiments of the invention.
Figure 5:
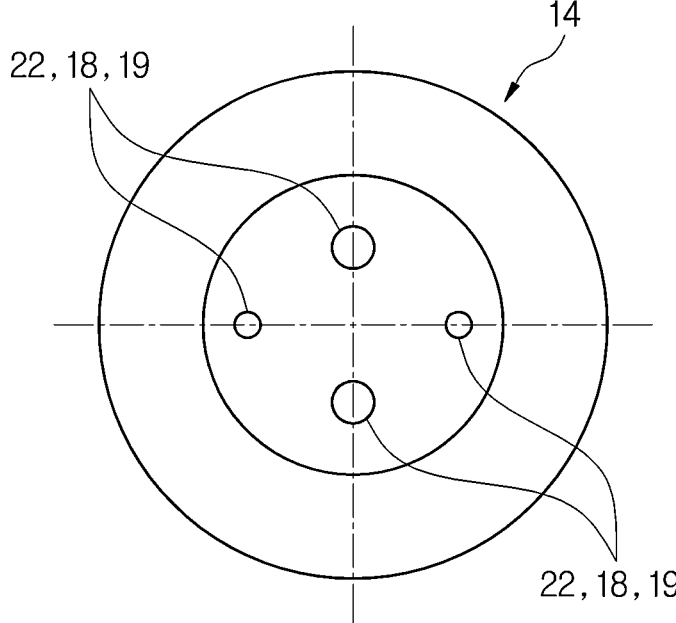
Figure 6:
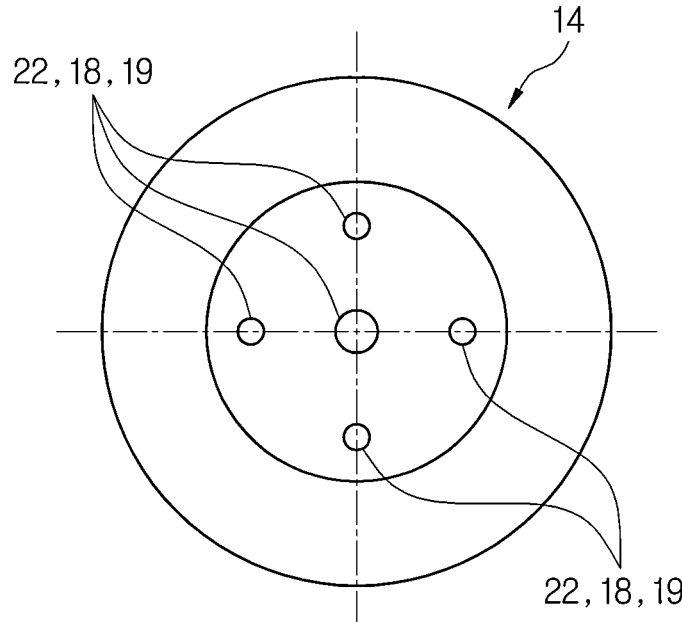

FIGS. 4-6 are rear views of brake pistons 14 according to further embodiments of the invention. The brake pistons 14 are generally configured similar to the example of FIG. 3, but with deviating positions and sizes of the second members 18.

In each of these figures, an end face of a third member 20 faces the viewer. A non-depicted longitudinal axis of the brake piston 14 thus extends orthogonally to the image plane. A rear face of the (exemplary) circular first member 16 is also visible. Further, the fluid channels 22 that are aligned with and have identical diameters as the brake fluid receiving portions 19 of obstructed second members 18 are visible.

It can be seen that the diameters of the fluid channels 22 and thus brake fluid receiving portions 19 may vary. One brake piston 14 may thus combine brake fluid receiving portions 19 with different diameters, e.g. smaller diameters of 1 to 1.5 mm and larger diameters of between 2 and 3 mm.

By positioning the second members 18, and in particular when these have different diameters, a locally varying pressure distribution may be defined. In FIG. 4, three second members 18 having fluid receiving portions 19 with enlarged diameters are regularly spaced about a central fluid receiving portions 19 having a smaller diameter. Thus, the pressure acting on the first member 16 and thus a non-illustrated brake pad is larger in a radially outer portion.

In FIG. 5, four second members 18 are regularly spaced around a centre of the brake piston 14 (i.e., and around its non-depicted longitudinal axis). Two of said second members 18 and more precisely their fluid receiving portions 19 have an enlarged diameter. The pressure along a (virtual) axis B extending through said second members 18 is thus increased.

In FIG. 6, a central second member 18 has a fluid receiving portion 19 with an enlarged diameter and provides a respectively increased central local pressure. Second members 18 having fluid receiving portions 19 with smaller diameters are distributed at regular angular distances around said central second member 18.

When instead providing second members 18 with identical diameters, it is still possible to provide locally varying pressure distributions, e.g. by spacing them apart at irregular radial and/or angular distances. On the other hand, in some cases it may be beneficial to generate a non-varying local pressure distribution by providing a regularly spaced pattern of second members 18 whose fluid receiving portions 19 have identical diameters.

Figure 7:
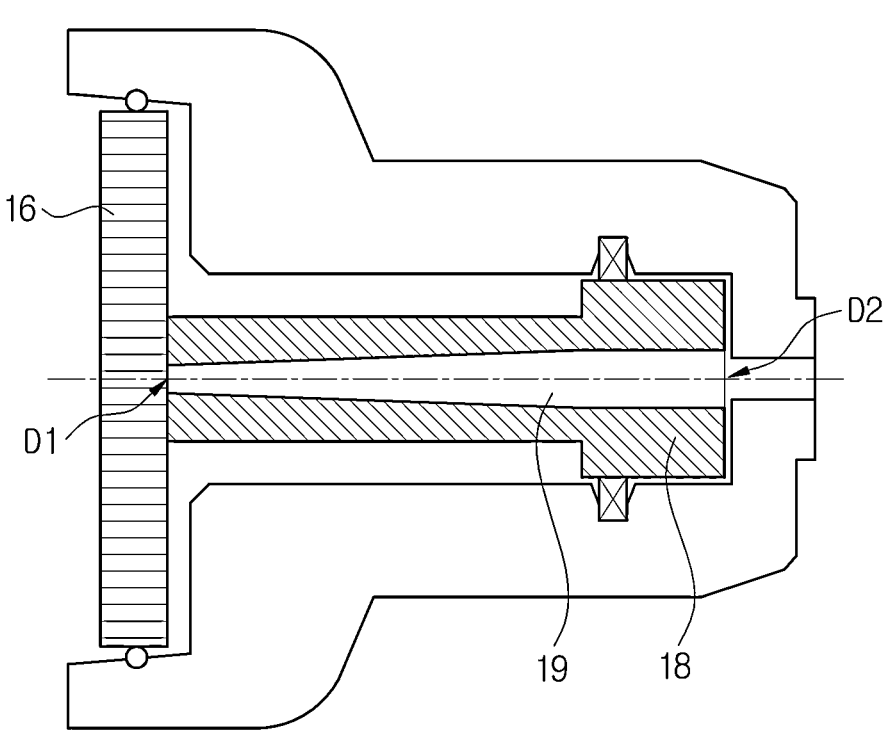
FIG. 7 is a sectional view of a brake arrangement according to a still further embodiment of the invention.

FIG. 7 shows another embodiment of the invention. Similar to FIGS. 1 and 2, only one second member 18 is depicted and only one such member 18 may be present. Yet, there may also be a plurality of second members 18. For example, a plurality of second members 18 may be provided and arranged according to any of the embodiments disclosed herein, with each second member 18 (or at least one out of said plurality) having the design of FIG. 7.

In FIG. 7, the second member 18 is provided with a brake fluid receiving portion 19 having a continuously varying diameter along its length (i.e. in between its depicted left end and its right end). As shown, the diameter is continuously decreasing towards the first member 16. Accordingly, the diameter D1 adjacent to the first member 16 is smaller than the diameter D2 at the opposite end, e.g. at most 80% or at most 70% as large. In one example, the diameter D1 is between (and including) 4 mm and up to and including 6 mm.

The decreasing diameter enables an advantageous pressure build-up and promotes a quick draining of fluid from the hydraulic chamber 19 once the brake is deactivated. Yet, the diameter could also be continuously increasing towards the first member 16.

What is claimed is:

1. A brake piston for a vehicle brake, the brake piston comprising:

a first member comprising a first piston end portion for resting against a brake pad of the vehicle brake;

a plurality of pipe-shaped second members that are each integrally formed with or fixedly attached to the first member and each comprise at least one brake fluid receiving portion that extends along a longitudinal axis of the brake piston.

2. The brake piston according to claim 1, wherein the first member is a plate-shaped member.

3. The brake piston according to claim 1, wherein each second member has a constant cross-sectional shape and/or a constant radial dimension.

4. The brake piston according to claim 1, wherein a connection between the first member and each of the plurality of pipe-shaped second members includes at least one of:

a mechanical connection, and a materially bonded connection formed by at least one of welding, soldering or glueing.

5. The brake piston according to claim 1, wherein a radial dimension of the fluid receiving portion of each second member is smaller than one quarter of a radial dimension of the first member.

6. The brake piston according to claim 1, further comprising a second piston end portion, wherein a radial dimension of said second piston end portion is larger than a radial dimension of each brake fluid receiving portion.

7. The brake piston according to claim 6, wherein the radial dimension of said second piston end portion is smaller a radial dimension of the first piston end portion.

8. The brake piston according to claim 6, wherein the second piston end portion comprises at least one fluid channel that is in fluidic communication with at least one of the fluid receiving portions.

9. The brake piston according to claim 6, wherein each of second members is connected to a third member comprising the second piston end portion.

10. The brake piston according to claim 1, wherein radial dimensions of the brake fluid receiving portions of the second members differ from one another.

11. A brake piston arrangement, comprising:

a housing having a cavity;

a brake piston according to toto claim 1;

wherein the brake piston is received in said cavity.

12. The brake piston arrangement according to claim 11, wherein the cavity has a first section for receiving the first member and further has a second section for receiving the second member or the plurality of second members, wherein a radial dimension of the second section is smaller than a radial dimension of the first section.

13. The brake piston arrangement according to claim 12, further comprising a fluid seal contacting the brake piston and the housing and being arranged in the second section of the cavity.

14. A brake piston for a vehicle brake, the brake piston comprising:

a first member comprising a first piston end portion for resting against a brake pad of the vehicle brake;

a pipe-shaped second member integrally formed with or fixedly attached to the first member and comprising at least one brake fluid receiving portion that extends along a longitudinal axis of the brake piston;

wherein a radial dimension of the brake fluid receiving portion is smaller than one quarter of a radial dimension of the first member and the radial dimension of the brake fluid receiving portion varies by substantially 0% or not more than 40% along a length of the brake fluid receiving portion.

* * * * *